(12) United States Patent
Endrigo

(10) Patent No.: US 11,519,318 B2
(45) Date of Patent: Dec. 6, 2022

(54) EMISSIONS REDUCTION SYSTEMS AND METHODS

(71) Applicant: David A. Endrigo, Poulsbo, WA (US)

(72) Inventor: David A. Endrigo, Poulsbo, WA (US)

(*) Notice: Subject to any disclaimer, the term of this patent is extended or adjusted under 35 U.S.C. 154(b) by 0 days.

(21) Appl. No.: 17/572,105

(22) Filed: Jan. 10, 2022

(65) Prior Publication Data

US 2022/0243637 A1 Aug. 4, 2022

Related U.S. Application Data

(63) Continuation of application No. 16/920,338, filed on Jul. 2, 2020, now Pat. No. 11,220,948.

(51) Int. Cl.
| | |
|---|---|
| *F01N 13/00* | (2010.01) |
| *F01N 3/10* | (2006.01) |
| *F01N 3/20* | (2006.01) |
| *F01N 3/28* | (2006.01) |

(52) U.S. Cl.
CPC .......... *F01N 13/0097* (2014.06); *F01N 3/103* (2013.01); *F01N 3/105* (2013.01); *F01N 3/2066* (2013.01); *F01N 3/2821* (2013.01); *F01N 2240/20* (2013.01); *F01N 2470/08* (2013.01); *F01N 2470/24* (2013.01)

(58) Field of Classification Search
CPC ............. F01N 13/0097; F01N 2240/20; F01N 2470/08; F01N 2470/24; F01N 2490/06; F01N 1/084
See application file for complete search history.

(56) References Cited

U.S. PATENT DOCUMENTS

| | | | |
|---|---|---|---|
| 3,768,982 A | 10/1973 | Kitzner et al. | |
| 4,326,492 A | 4/1982 | Leibrand, Sr. et al. | |
| 4,612,896 A | 9/1986 | Leibrand, Sr. | |
| 5,155,995 A | 10/1992 | Kinnear et al. | |
| 5,277,026 A * | 1/1994 | Boll | F01N 3/2053 60/299 |
| 5,582,803 A | 12/1996 | Yoshizaki et al. | |
| 5,934,071 A * | 8/1999 | Schatz | F01N 5/02 60/284 |
| 6,016,654 A * | 1/2000 | Schatz | F01N 3/2053 60/292 |
| 6,875,407 B1 | 5/2005 | Biel | |
| 7,341,699 B2 | 11/2008 | Thieman et al. | |
| 7,611,561 B2 | 1/2009 | Hill | |
| 7,807,120 B2 | 10/2010 | Hansen et al. | |

(Continued)

FOREIGN PATENT DOCUMENTS

| | | |
|---|---|---|
| CN | 206439094 | 8/2017 |
| DE | 202016104446 | 8/2016 |
| WO | 2014117950 | 8/2014 |

OTHER PUBLICATIONS

Patent Translate, Description from WO2014117950, Apr. 2020 (Machine translation of the description from FPD WO2014117950).

(Continued)

*Primary Examiner* — Jonathan R Matthias
(74) *Attorney, Agent, or Firm* — McAughan Deaver PLLC

(57) ABSTRACT

An internal combustion engine emissions reduction system in which a emissions passing through a second catalyst element having a second catalyst function are mixed with emissions passing through a first catalyst element having a first catalyst function.

20 Claims, 10 Drawing Sheets

(56) References Cited

U.S. PATENT DOCUMENTS

| | | | |
|---|---|---|---|
| 8,034,310 B2 | 10/2011 | Hansen et al. | |
| 8,298,504 B2 | 10/2012 | Hansen et al. | |
| 8,307,631 B2 * | 11/2012 | Santoso | F01N 9/00 |
| | | | 60/287 |
| 8,443,593 B2 * | 5/2013 | Sloss | F02D 9/04 |
| | | | 165/41 |
| 8,765,084 B2 | 7/2014 | Hansen et al. | |
| 9,267,416 B2 | 2/2016 | Toelle | |
| 9,295,944 B2 | 3/2016 | Takagaki et al. | |
| 9,322,309 B2 | 4/2016 | Beyer et al. | |
| 2009/0271096 A1 * | 10/2009 | Matsubara | F02M 69/465 |
| | | | 701/113 |
| 2020/0018207 A1 | 1/2020 | Brugger et al. | |

OTHER PUBLICATIONS

EPO, CN206439094 Coaxial integrated post processor device of arranging, Apr. 2020 (Machine translation of FPD CN206439094).
Google Patents, Vehicle Catalyst ans Honeycomb body for this, Apr. 2020 (Translation of DE202016104446).
International Searching Authority, International Search Report, PCT/US2021/070818, dated Nov. 12, 2021, Patent Cooperation Treaty, USPTO.
International Searching Authority, Written Opinion, PCT/US2021/070818, dated Nov. 12, 2021, Patent Cooperation Treaty, USPTO.

* cited by examiner

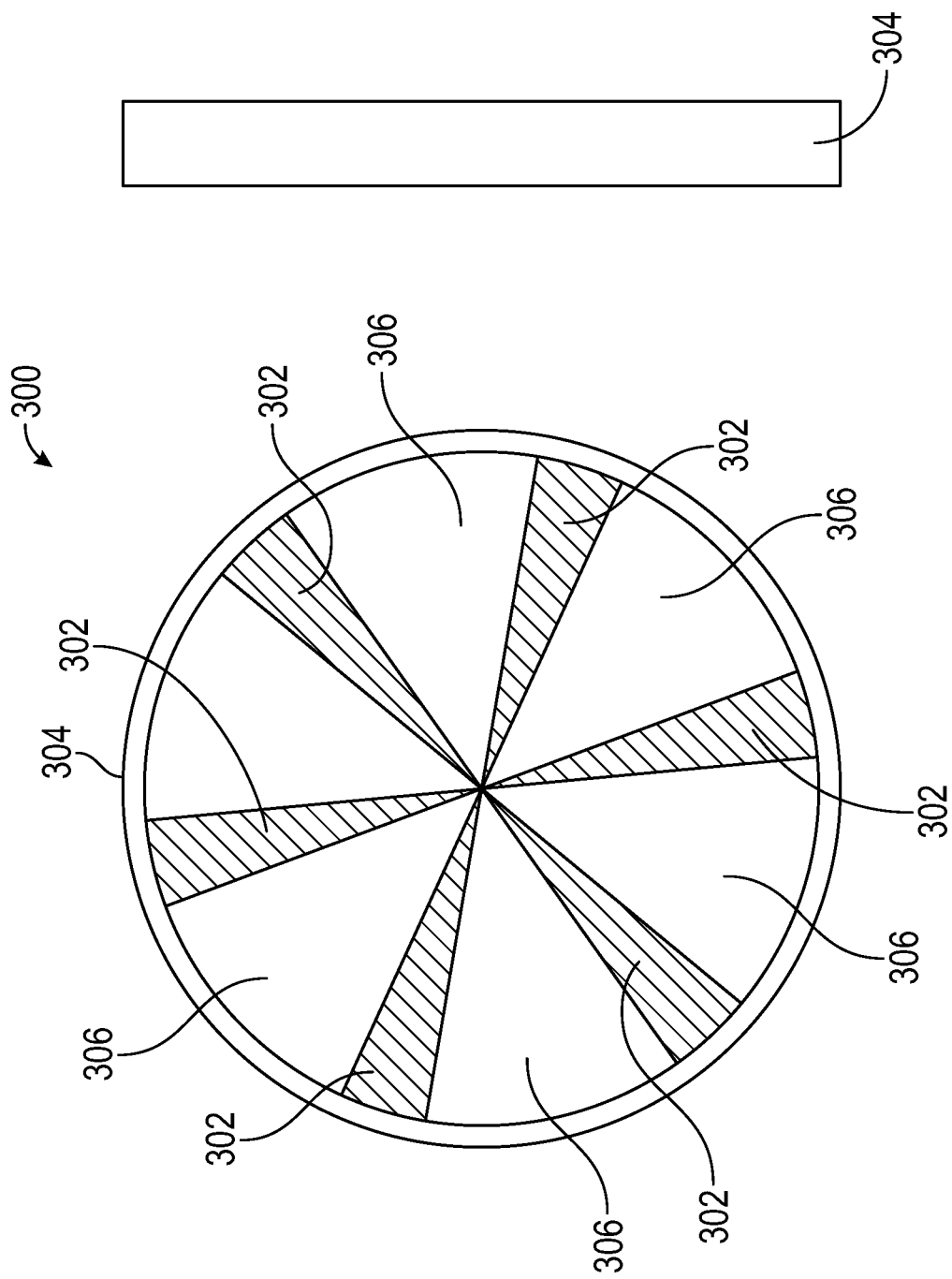

EMISSIONS REDUCTION SYSTEMS AND METHODS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present inventions relate generally to catalytic reaction chambers for combustion exhaust gases commonly referred to as catalytic converters.

Description of the Related Art

U.S. Pat. No. 7,807,120 entitled High-Efficiency Catalytic Converters For Treating Exhaust Gases discloses "[s]everal embodiments of high-efficiency catalytic converters and associated systems and methods []. In one embodiment, a catalytic converter for treating a flow of exhaust gas comprising a reaction chamber, a heating enclosure enclosing at least a portion of the reaction chamber, and an optional coolant channel encasing; the heating enclosure. The reaction chamber can have a first end section through which the exhaust gas flows into the reaction chamber and a second end section from which the exhaust gas exits the reaction chamber. The heating enclosure is configured. to contain heated gas along the exterior of the reaction chamber, and the optional coolant channel is configured to contain a flow of coolant around the heating enclosure. The catalytic converter can further include a catalytic element in the reaction chamber."

United States Patent Application Publication No. 2020/0018207 entitled Exhaust Gas System discloses "[a]n exhaust system for the aftertreatment of exhaust gases of an internal combustion engine, having an annular catalytic converter which is flowed through by exhaust gas, wherein the annular catalytic converter has an inflow point and an outflow point and the annular catalytic converter has a tubular first flow path and an annular second flow path which are oriented concentrically with respect to one another and which are flowed through in series, wherein the first flow path is surrounded to the outside in a radial direction by the second flow path, wherein a pipe is led in the radial direction from the outside through the second flow path, wherein the pipe opens into the annular catalytic converter and the pipe has a radial extent at least as far as into the inner first flow path."

U.S. Pat. No. 3,768,982 entitled Catalytic Converter with Electrically Preheated Catalyst discloses "[h]eat from an electric heater is transferred conductively through a monolithic support to a catalyst located on the surfaces of the monolithic support. Engine exhaust gases passing through the monolithic support contact the heated catalyst, which assists in converting undesirable components of the exhaust gases into less harmful components. Supplemental air is supplied to the exhaust gases from an annular distributing space located at the converter inlet."

The inventions disclosed herein are directed to improved high efficiency catalyst-based emission reduction systems and methods of use.

BRIEF SUMMARY OF THE INVENTIONS

While not all aspects of my inventions disclosed herein will be summarized, a brief summary of one aspect of my inventions includes an internal combustion engine emission reduction system comprising a first catalyst element configured for oxidizing catalytic reactions, a second catalyst element configured for reduction catalytic reactions, and configured to direct a portion of exhaust that has been reacted by the first or first and second catalyst elements back through the first catalyst element.

A brief summary of other aspects of my inventions includes an internal combustion engine emission reduction system comprising a first catalyst element configured for reducing catalytic reactions, a second catalyst element configured for oxidizing or redox catalytic reactions, and configured to direct a portion of exhaust that has been reacted by the first or first and second catalyst elements back through the first catalyst element.

A brief summary of other aspects of my inventions includes an internal combustion engine emission reduction system comprising a body having a primary emission inlet and an emission outlet; a first catalyst element having a first catalytic function and disposed within the body between the emission inlet and the emission outlet such that all of the emissions flowing into the inlet flow through the first catalyst element; a second catalyst element disposed within the body and disposed to surround an outer surface of the first catalyst element, and having a second catalytic function that is different from the first catalytic function; a wall disposed between an outer surface of the first catalyst element and an inner surface of the second catalyst element, and configured to transfer heat from the first catalyst element to the second catalyst element and configured to prevent emissions flowing in the first catalyst element from leaking into the second catalyst element; a diverter disposed within the body between the emission outlet and a downstream end of the first catalyst element, and configured to divert less than all of the emissions flowing out of the first catalyst element to flow in a countercurrent direction through the second catalyst element; and a secondary emissions inlet disposed within the body and associated with the primary emission inlet and an upstream end of the first catalyst element, and configured to allow emissions flowing through the second catalyst element to flow into the first catalyst element with emissions from the primary emissions inlet. The secondary emissions inlet may comprise a plurality of openings shrouded with respect to emissions flowing in the primary emission inlet. The plurality of shrouded openings may be formed in the primary emissions inlet. The plurality of shrouded openings may be formed in an inlet transition disposed between the primary emissions inlet and the first catalyst element. The plurality of shrouded openings may be formed at a common radial distance from an inlet centerline. The plurality of shrouded openings may be formed at a plurality of radial distances from an inlet centerline. The secondary emissions inlet may comprise at least one channel formed in an inlet transition and located within the body such that the at least one channel is shrouded by an end of the primary emission inlet with respect to emissions flowing through the primary emission inlet. The secondary emissions inlet may comprise a plurality of channels formed at a common radial distance from an inlet centerline. The secondary emissions inlet may comprise a plurality of channels formed at a plurality of radial distances from an inlet centerline. The first catalyst element may be configured for oxidation reactions, and the second catalyst element may be configured for reduction reactions. The first catalyst element may be configured for reduction reactions, and the second catalyst element may be configured for oxidation reactions.

A brief summary of other aspects of my inventions includes a method of reducing undesirable emissions from internal combustion engine exhaust comprising flowing engine exhaust through a first catalyst element to cause a desired first chemical reaction in the engine exhaust; diverting at least a portion of the engine exhaust that has passed through the first catalyst element; flowing the diverted portion of engine exhaust through a second catalyst element to cause a desired second chemical reaction in the diverted engine exhaust; and mixing the diverted engine exhaust that has passed through the second catalyst element with engine exhaust entering the first catalyst element. Diverting at least a portion of the engine exhaust may comprise diverting between about 10% and about 30% of the engine exhaust that has passed through the first catalyst element.

A brief summary of other aspects of my inventions includes an emission reduction system for an internal combustion engine comprising a body having a primary emission inlet and an emission outlet; a first catalyst element having a first catalytic function and disposed within the body between the emission inlet and the emission outlet such that at least a portion of the emissions flowing into the emission inlet flow through the first catalyst element; a second catalyst element disposed within the body and surrounding an outer surface of the first catalyst element, and having a second catalytic function that is different from the first catalytic function; a recycle flow path disposed within the body and configured to divert all of the emissions flowing out of the second substrate into a recycle flow path; and a secondary emissions inlet disposed within the body and associated with the primary emission inlet and an end of the first catalyst element, and configured to permit emissions flowing in the recycle pathway to mix with emissions exiting the primary emissions inlet. The secondary emissions inlet may comprise a plurality of openings shrouded with respect to emissions flowing in the primary emission inlet. The plurality of shrouded openings may be formed in the primary emissions inlet. The plurality of shrouded openings may be formed in an inlet transition disposed between the primary emissions inlet and the first catalyst element. The plurality of shrouded openings may be formed at a common radial distance from an inlet centerline. The plurality of shrouded openings may be formed at a plurality of radial distances from an inlet centerline. The secondary emissions inlet comprises at least one channel formed in an inlet transition and located with the body such that the at least one channel is shrouded by an end of the primary emission inlet with respect to emissions flowing through the primary emission inlet. The inlet transition may comprise a plurality of channels formed at a common radial distance from an inlet centerline. The inlet transition may a plurality of channels formed at a plurality of radial distances from an inlet centerline. The first catalyst element may be configured for oxidation reactions, and the second catalyst element is configured for reduction reactions. The first catalyst element may be configured for reduction reactions, and the second catalyst element may be configured for oxidation reactions.

A brief summary of other aspects of my inventions includes a method of reducing undesirable components in internal combustion engine exhaust comprising flowing a first portion of engine exhaust through a first catalyst element to cause a desired first chemical reaction in the first portion of the engine exhaust; flowing a second portion of engine exhaust through a secondary catalyst reaction chamber to cause a desired second chemical reaction in the second portion of engine exhaust; redirecting the second portion of engine exhaust that has passed through the secondary catalyst element to an inlet for the first catalyst element; and mixing the redirected second portion of engine exhaust with engine exhaust entering the first catalyst element. Redirecting the second portion of the engine exhaust may comprise redirecting between about 10% and about 30% of the engine exhaust that has passes through the first and second catalyst elements.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

FIGS. 3A and 3B illustrate an embodiment of a flow mixer useful with catalytic reaction chambers according to aspects of the inventions disclosed herein.

Figure 1A:
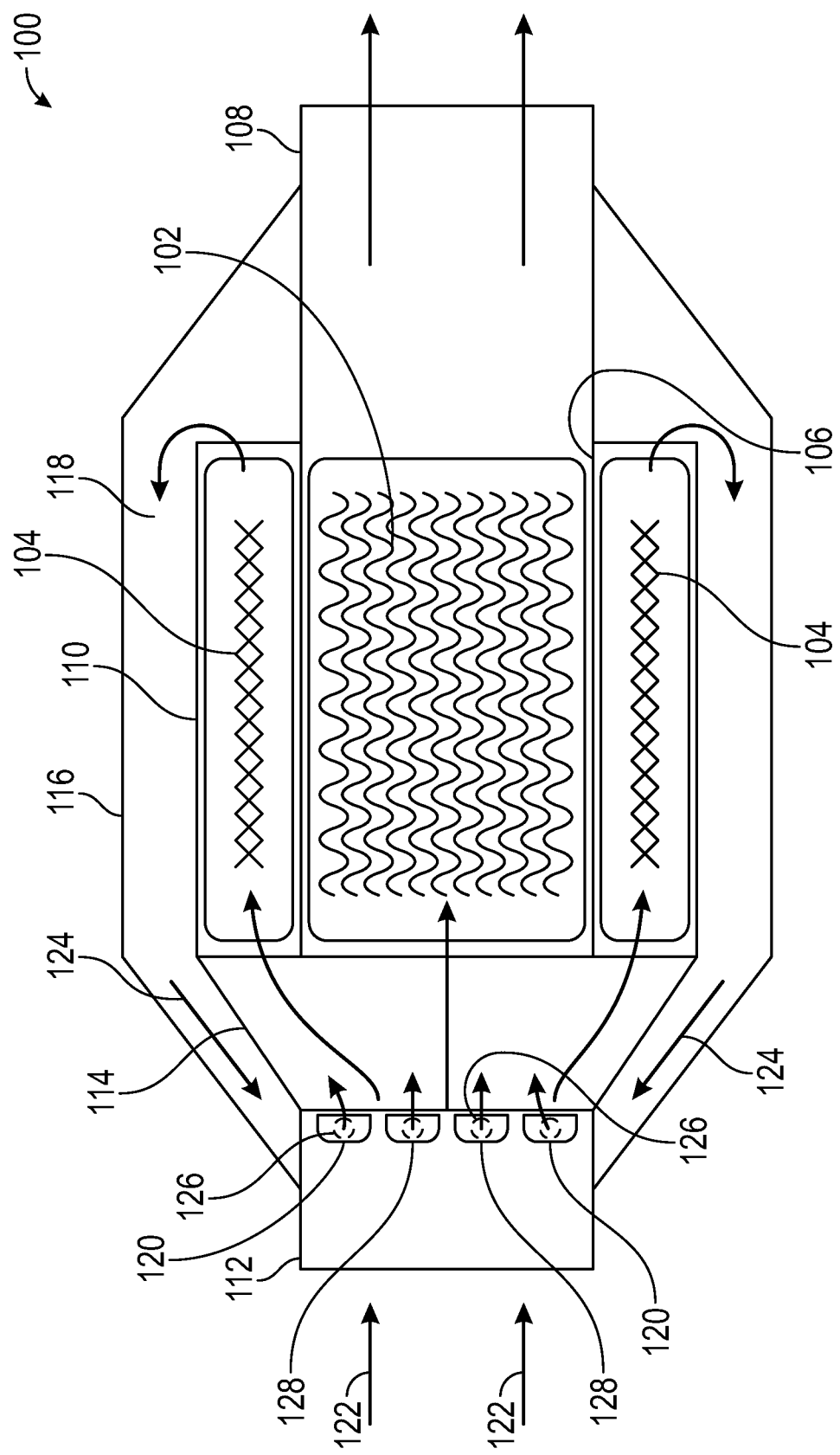
FIG. 1A illustrates an embodiment of a catalytic reaction chamber according to aspects of the inventions disclosed herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures attached hereto and described above, and the written description of the figures, specific structures and functions below are not presented to limit the scope of what I have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. For example, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

Aspects of the inventions disclosed herein may be embodied as an apparatus, system, or method. Accordingly, specific embodiments may take the form of an entirely hardware embodiment, or an embodiment combining software and hardware aspects, such as a "circuit," "module" or "system." Furthermore, embodiments of the present inventions may take the form of a computer program product embodied in one or more computer readable storage media having computer readable program code.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

The description of elements in each figure may refer to elements of proceeding figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In general terms, I have invented catalytic reaction chambers useful in reducing unwanted combustion gas products, such as carbon monoxide and nitrogen oxides, volatile organic hydrocarbons (VHOC) and/or particulates from internal combustion engine exhaust. Catalytic reaction chambers also may be referred to in the art as catalytic converters, two-way oxidizing converters, three-way redox converters, four-way oxygen injection converters, and/or diesel oxidation converters. Although these reaction chambers are primarily used in exhaust systems for automobiles, they also are used on trucks, buses, forklifts, mining equipment, generator sets, locomotives, motorcycles, airplanes and other vehicles and equipment having internal combustion engines, and on some wood stoves. Reaction chambers incorporating my inventions may comprise first and second catalytic beds, matrices, or monoliths.

For purposes of this disclosure I will use the general term "catalyst element" to refer to a flow-through substrate, such as a core, bed, matrix, or monolith to which catalytic activity has been added. As is known, the flow through substrate may be a ceramic monolith or a ceramic honeycomb structure. The substrate also may be formed from a metallic foil, which is typically made from iron, chromium, aluminum, stainless steel or combinations thereof. Regardless of the type or form of substrate, substrates are designed to provide a flow through structure with large surface area to which the catalytic activity may be applied. The catalytic activity may be applied to the substrate as a washcoat, which is basically a water-based carrier for the catalytic material that is then dried and calcined. The washcoat may comprise oxides, such as titanium dioxide, aluminum oxide, silicon dioxide or combinations of oxides, to provide a rough, irregular surface to increase the surface area for the catalytic material. The catalytic material may be present in the washcoat or may be separately impregnated in or applied to the washcoat. During calcination, the catalyst materials decompose to the final material, usually a metal or a metal oxide, having the catalytic activity.

A first or primary catalyst element may comprise oxidation, reduction, or reduction/oxidation (redox) catalyst material or materials, including one or more of platinum, palladium, rhodium, cerium, iron, manganese, nickel or copper configured to oxidize carbon monoxide to carbon dioxide, oxidize unburnt hydrocarbons to carbon dioxide and water, and/or reduce nitrogen oxides to nitrogen. The second catalyst element also may comprise oxidation, reduction, or reduction/oxidation (redox) catalyst material or materials, including one or more of platinum, palladium, rhodium, cerium, iron, manganese, nickel or copper configured to oxidize carbon monoxide to carbon dioxide, oxidize unburnt hydrocarbons to carbon dioxide and water, and/or reduce nitrogen oxides to nitrogen. Preferably, the second catalyst element comprises a reduction catalyst material, such as cerium or rhodium, or a $NO_x$ adsorber, such as zeolite, to reduce nitrogen oxides to nitrogen, or capture nitrogen oxides. By physically separating the second catalyst element from the first catalyst element, the effectiveness of each catalyst element may be maximized and/or parasitic effects of the catalyst materials may be mitigated. For example, it is known that cerium may reduce the effectiveness of a platinum-bearing catalyst element. Additionally, the catalytic activity of the second catalyst element may be selected to eliminate the need for urea injection in diesel applications. It is presently preferred, but not required, that the first catalyst element be configured as a three-way redox catalyst, and the second catalyst be configured as a reduction catalyst. Alternately, the first catalyst element may be configured as a reduction catalyst, and the second catalyst element configured as a redox catalyst.

In some embodiments, the primary catalyst element is housed within a metal casing or body and the secondary catalyst element may form an annular ring around the primary catalyst element on the outside of the metal casing. Uncatalyzed or unreacted combustion gases (i.e., combustion gases upstream of the catalyst elements) flow effectively simultaneously through both the primary and secondary catalyst elements. Reacted exhaust gases (i.e., combustions gases that have passed through a catalyst element) exiting the secondary catalyst element are diverted or directed back to the reaction chamber inlet and injected, entrained, or mixed with incoming unreacted combustion gases. The amount of diverted or redirected reacted gases may range between about 2% to about 45%, by volume, and preferably between about 10% and about 30% of the total volume of exhaust gases flowing through the reaction chamber.

In other embodiments, the primary catalyst element may be housed within a metal casing or body and the secondary catalyst element may form an annular ring around the outside of the metal casing. The reaction chambers are configured such that unreacted combustion gases flow first through the primary catalyst element. A portion of the exhaust gases reacted by the primary catalyst element are diverted or redirected, after exiting the primary catalyst element, to pass through the secondary catalyst element and then to the primary catalyst element reaction chamber inlet and. Gases reacted by the secondary catalyst are then injected, entrained, or mixed with incoming unreacted combustion gases. The amount of diverted or redirected reacted gases may range between about 2% to about 45%, by volume, and preferably between about 10% and about 30%.

While it is contemplated that many embodiments will utilize cylindrical or substantially cylindrical first catalyst elements, and second catalyst elements comprising an elongated toroid, it will be appreciated that catalyst shapes other than cylinders and elongated toroids may be used. For example, but not limitation, the first catalyst element may have an oval or elliptical cross-section (e.g., an elliptical cylinder), and the second catalyst element may have a corresponding elongated toroidal shape.

In other embodiments, a flow mixer may be placed in the reaction chamber inlet to mix the recycled reacted gases from the secondary catalyst element more effectively with the unreacted combustion gases.

In other embodiments, a heating element, including but not limited to a tungsten heating element, may be placed within the primary catalyst element and may be configured to raise the temperature of the primary catalyst element to optimum operation temperature, for example, to temperatures of between about 700° F. to about 900° F. or higher. The heating element may be powered by AC or DC power generated by the internal combustion engine or stored in a battery. The metal casing between the primary and secondary catalyst may be configured to transfer heat from the primary catalyst to secondary catalyst. For those applications, such as diesel engines, where the combustion temperature (i.e., the temperature of the engine exhaust in the catalyst elements) is insufficient to create a "clean" burn with low particulate matter, the heating element may be activated to reduce emissions. For example, a catalytic reaction chamber utilizing aspects of the inventions disclosed herein may eliminate the need for diesel particulate filters.

In other embodiments, the reaction chamber is surrounded by one or more fluid conduits or channels that is configured to transfer heat from the reaction chamber to one or more fluids flowing through the conduits or channels. For example, aircraft flying at high altitudes or vehicles and equipment operating in cold climates may benefit from preheating fuel in the fluid conduit associated with the reaction chamber. In addition, passenger compartment heat may be supplied by a heater fluid circulated through the fluid conduit. It will be appreciated that other fluids associated with vehicles or equipment having internal combustion engines may utilize the fluid conduit associated with the reaction chamber to heat, including preheat, one or more of the fluids.

Turning now to more detailed descriptions of several embodiments, FIG. 1A illustrates a reaction chamber 100 comprising a first catalyst element 102 and a second catalyst element 104. In this embodiment, the first catalyst element 102 may be housed in a first housing 106, which may also comprise the reaction chamber outlet 108. It is preferred that the first housing 106 or first housing/outlet combination comprise a metal alloy material, such as alloy steel, stainless steel, aluminum, titanium, or the like, suitable to withstand the operating conditions and to facilitate heat transfer out of the first catalyst element 102 and yet prevent combustion gas from leaking out of the first catalyst element 102. In some embodiments, the first housing 106/outlet 108 may comprise a cylindrical length of metal pipe into which the first catalyst element 102 may be securely deployed, as illustrated in FIG. 1A.

The second catalyst element 104 preferably is cylindrically shaped and disposed about the outer surface of the first housing 106 as illustrated. A second housing 110 is disposed about the outer surface of the second catalyst element 104 and is configured to allow combustion gas 122 to flow through the second catalyst element 104 without leaking into the first catalyst element 102. It is preferred that the second housing 110 comprise a metal alloy material, such as alloy steel, stainless steel, aluminum, titanium, or the like. In most embodiments the second housing 110 will be made from the same material as the first housing 106. The second housing 110 also may comprise a cylindrical length of metal pipe into which the second catalyst element 104 may be securely deployed as illustrated in FIG. 1A.

The reaction chamber 100 illustrated in FIG. 1A also comprises an inlet 112 configured to communicate combustion gases to the first and second catalyst elements 102, 104. In FIG. 1A, the diameter of the catalyst elements 102, 104 is larger than the diameter of the inlet 112. In this circumstance, the reaction chamber 100 may comprise an inlet transition 114 that joins, such as by welding, fastening, crimping or other joining methods, the outer housing 110 to the inlet 112 so that the combustion gas entering the reaction chamber 100 flow through the first and second catalyst elements 102, 104. In those circumstances where the diameter of the catalyst elements matches the diameter of the inlet, an inlet transition may not be needed.

An outer shell 116 forms the outer surface of the reaction chamber 100 and defines a plenum 118 through which gases reacted by the second catalyst element 104 may flow. As illustrated in FIG. 1A, the outer shell 116 is joined or sealed to the outlet 108 and to the inlet 112. It is preferred that the outer shell 116 comprise a metal alloy material, such as alloy steel, stainless steel, aluminum, titanium, or the like. In some embodiments the outer shell will be made from the same material as the first housing 106 and second housing 110. In other embodiments, the outer shell may be formed from a dissimilar material.

The embodiment illustrated in FIG. 1A further comprises one or more secondary inlets 120 configured to allow the plenum 118 to fluidly communicate with the inlet 112 region through which unreacted combustion gas 122 may flow. It is preferred that the secondary inlet(s) 120 be shielded or shrouded with respect to the upstream flow of combustion gases to aid or benefit the flow of reacted combustion gases 124 back into the inlet 112 region. For example, secondary inlet(s) 120 may be formed in the inlet 112 by mechanically punching or drawing an opening 126. The material that is drawn or punched may form a shield 128 shrouding all or part of the opening 126 from the upstream flow 122 as illustrated in FIG. 1A. Combustion gases 122 flowing over and past the shielded secondary inlet(s) 120 preferably create a region of lower pressure at the opening(s) 126 to facilitate the flow reacted combustion gases 124 into the inlet 112 region.

As will now be appreciated for the embodiment of FIG. 1A, the reaction chamber 100 may be placed in an exhaust system (not shown) so that combustion gases 122 flow into inlet 112 and then through the first and second catalyst elements 102, 104. The portion of combustion gases 122 that flow through and react with the first catalyst element 102 exit the reaction chamber 100 through outlet 108. The portion of combustion gases 122 that flow through and react with the second catalyst element 104 are directed into the plenum 118 and flow in a direction opposite to the combustion gases 122 and back to the inlet 112 region. These reacted gases 124 are drawn or forced into the inlet 112 region and mix with incoming unreacted combustion gases 122. This combined mixture of unreacted combustion gases 122 and reacted gases 124 flows again through both the first and second catalyst elements 102, 104.

In the embodiment of FIG. 1A, the volumetric split of combustion gases between the first and second catalyst elements 102, 104 is determined mostly, if not exclusively, by the inlet area (e.g., cross-sectional area) of the catalyst elements. For example, if the first catalyst element 102 is effectively cylindrical in shape and has a diameter of 3 inches, and if the second catalyst element 104 also is effectively a hollow cylinder (elongated toroid) in shape with an annular thickness of ¼ inch, about 70% of the combustion gases will flow through the first catalyst element and the remaining about 30% will flow through the second catalyst 104. In other words, such an embodiment would have a recycle factor of about 0.3. It is preferred that the recycle factor range between about 0.02 and about 0.45, and most preferably between about 0.10 and 0.30.

In FIG. 1A, the first catalyst element 102 may comprise an oxidation or a reduction/oxidation (redox) catalyst, including one or more of platinum, palladium, rhodium, cerium, iron, manganese, nickel or copper configured to oxidize carbon monoxide to carbon dioxide, oxidize unburnt hydrocarbons to carbon dioxide and water, and/or reduce nitrogen oxides to nitrogen. The second catalyst element 104 may comprise a reduction catalyst or $NO_x$ adsorber, such as zeolite, to reduce nitrogen oxides to nitrogen.

Figure 1B:
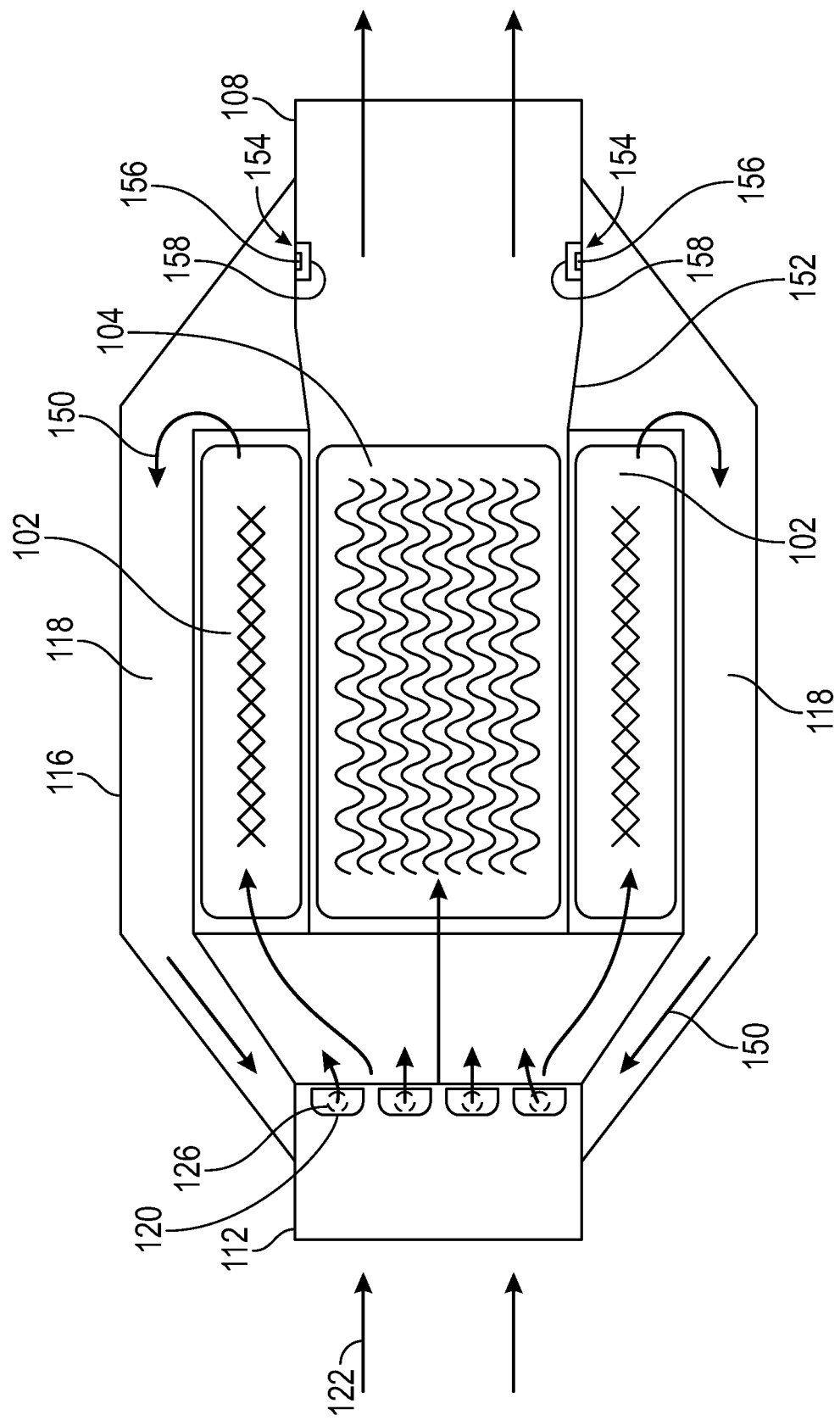
FIG. 1B illustrates another embodiment of a catalytic reaction chamber according to aspects of the inventions disclosed herein.

Alternately, as illustrated in FIG. 1B, the first catalyst element 102 may be configured to reduce nitrogen oxides to nitrogen, and the second catalyst element 104 may be the primary catalyst and be configured for oxidation and/or redox reactions. It will be appreciated that in this embodiment, the first catalytic element 102 may have a size smaller than the inlet 112 or outlet 108. In such circumstance, an outlet transition 152 may comprise a diverging nozzle to fluidly couple with outlet 108. For such embodiments, the recycle ratthrough the second catalyst element 104 may be between about 0.98 to about 0.55, and preferably between about 0.90 and about 0.70. To prevent excessive or undesirable back pressure on the internal combustion engine, the outlet transition 152 or the outlet 108 may comprise one or more pressure relief valves 154 configured to relieve pressure in the recycle conduit 118. A pressure relief valve 154 may comprise a flow opening 156 having a predetermined size based on a desired flow volume, or flow rate. A pressure relief valve 154 also may comprise a shroud or shield 158 configured to shield the valve from upstream gas flow.

Figure 2:
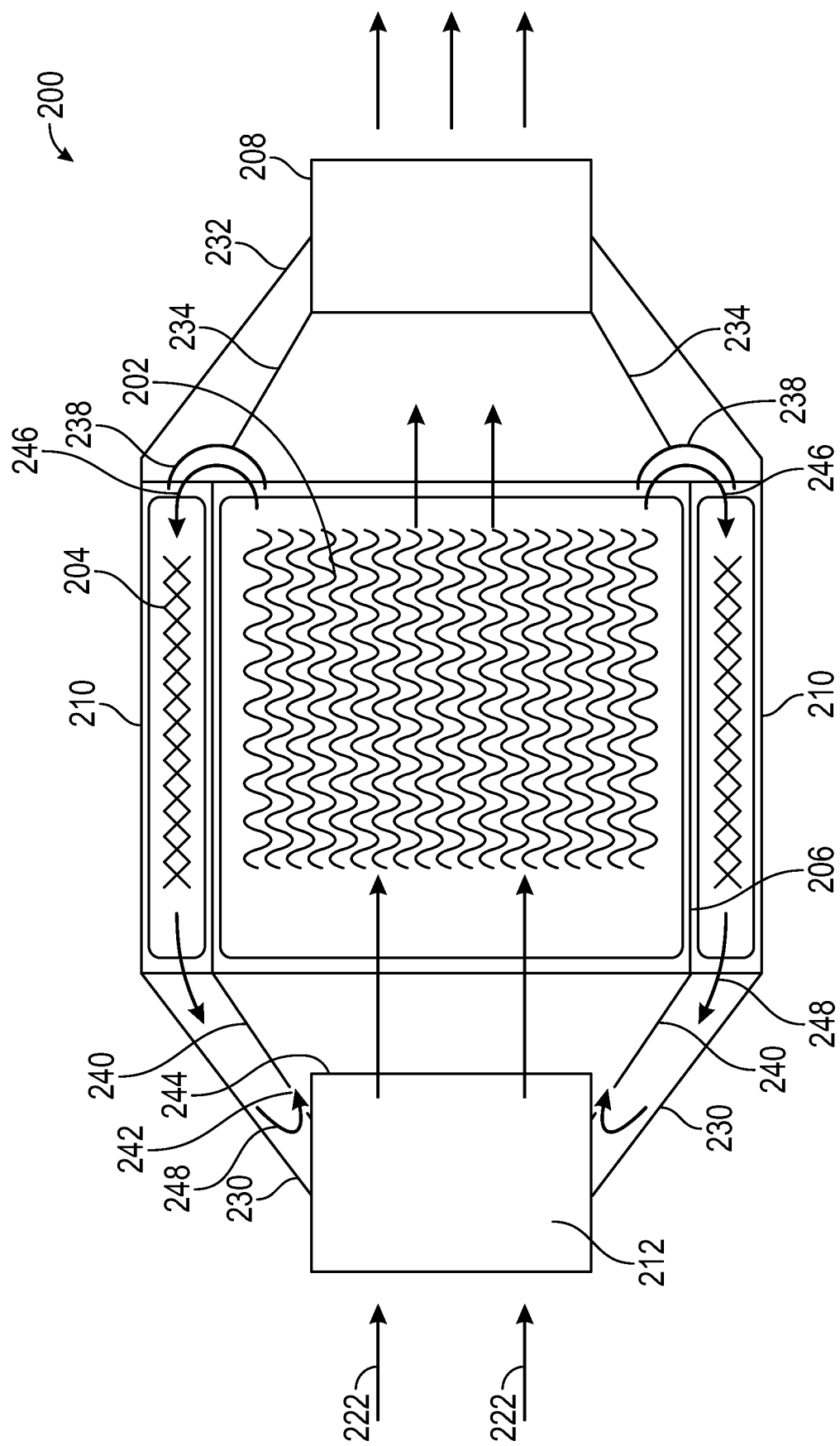
FIG. 2 illustrates another embodiment of a catalytic reaction chamber according to aspects of the inventions disclosed herein.

FIG. 2 illustrates another embodiment of a reaction chamber 200 using aspects of the present inventions. A reaction chamber 200 may comprise a first catalyst element 202 and a second catalyst element 204. In this embodiment, the first catalyst element 202 may be housed in a first housing 206. It is preferred that the first housing 206 comprise a metal alloy material, such as alloy steel, stainless steel, aluminum, titanium, or the like, capable of withstanding the operating conditions and facilitating heat transfer out of the first catalyst element 202 and yet prevent combustion gas from leaking out of the first catalyst element 202. In some embodiments, the first housing 206 may comprise a cylindrical length of metal pipe into which the first catalyst element 202 may be securely deployed, as illustrated in FIG. 1.

The second catalyst element 204 preferably is disposed about the outer surface of the first housing 206 as illustrated. A second housing 210 is disposed about the outer surface of the second catalyst element 204. It is preferred that the second housing 210 comprise a metal alloy material, such as alloy steel, stainless steel, aluminum, titanium, or the like. In most embodiments the second housing 210 will be made from the same material as the first housing 206. The second housing 210 also may comprise a cylindrical length of metal pipe into which the second catalyst element 204 may be securely deployed as illustrated in FIG. 2.

The reaction chamber 200 illustrated in FIG. 2 also comprises an inlet 212 configured to communicate combustion gases 222 to the first catalyst element 202, and an outlet 208 from which combustion gases exit the reaction chamber 200. The second housing 210 is joined or sealed to both the inlet 212 and outlet 208. In FIG. 2, the diameter of the first catalyst element 202 is larger than the diameter of the inlet 212 or the outlet 208. In this circumstance, the reaction chamber 200 may comprise first and second housing transitions 230, 232 that join, such as by welding, fastening, crimping or other joining methods, the outer housing 210 to the inlet 212 and outlet 208. In those circumstances where the diameter of the catalyst element 202 matches the diameter of the inlet, housing transitions may not be needed.

The embodiment illustrated in FIG. 2 further comprises an outlet transition 234 preferably in the form of a truncated cone, one end of which is coupled or joined to the outlet 208. The other end of the outlet transition 234 comprises one or more flow diverting elements 238 configured and placed to divert or redirect a portion of the combustion gases exiting the first catalyst element 202 to flow through the second catalyst element 204 in a flow direction opposite to the flow direction of the combustion gases through the first catalyst element 202.

The embodiment illustrated in FIG. 2 further comprises an inlet transition 240 preferably in the form of a truncated cone, one end of which is coupled or joined to the first housing 206. The other end of the inlet transition 240 comprises one or more flow outlets 242 configured and placed to allow combustion gases passing through the second catalyst element 204 to be drawn into or flow into the combustion gases 222 flowing into the first catalyst element 202. As illustrated in FIG. 2, it is preferred that the flow outlet(s) 242 are shadowed or shielded by the end 244 of the inlet 212. Placement of the flow outlet(s) 242 in this manner creates a zone of lower pressure that aids or facilitates the flow of gases from the second catalyst element back into the first catalyst element.

As will now be appreciated for the embodiment of FIG. 2, the reaction chamber 200 may be placed in an exhaust system (not shown) so that combustion gases 222 flow into inlet 212 and then through and react with the first catalyst element 202. A portion of these reacted combustion gases 246 are diverted or redirected to flow through and react with the second catalyst element 204 in a direction opposite to the combustion gases 222 and back to the inlet 212 region. These reacted gases 248 are drawn or forced into the inlet 212 region and mix with incoming combustion gases 222. This combined mixture of combustion gases 222 and reacted gases 248 flow again through the first catalyst element 202 for catalytic reaction.

Similarly to the embodiments of FIG. 1A and 1B, in the embodiment of FIG. 2 the volumetric split of combustion gases between the first and second catalyst elements 202, 204 is determined mostly by the capture area of the diverter (s) 238. It is preferred that the diverter(s) 238 divert or redirect between about 2% and about 45% of the gases that pass through the first catalyst element 202, and most preferably between about 10% and about 30%.

The first catalyst element may comprise an oxidation, a reduction, or a reduction/oxidation (redox) catalyst, including one or more of platinum, palladium, rhodium, cerium, iron, manganese, nickel or copper configured to oxidize carbon monoxide to carbon dioxide, oxidize unburnt hydrocarbons to carbon dioxide and water, and/or reduce nitrogen oxides to nitrogen. The second catalyst element may comprise a reduction catalyst or $NO_x$ adsorber, such as zeolite, to reduce nitrogen oxides to nitrogen, or capture nitrogen. Alternately, the first catalyst element may be configured to reduce nitrogen oxides to nitrogen, and the second catalyst element may be the primary catalyst and be configured for oxidation and/or redox reactions. For such embodiments, the recycle ratthrough the second catalyst element may be between about 0.98 to about 0.55, and preferably between about 0.90 and about 0.70.

FIGS. 3A and 3B illustrate an optional flow mixer 300 comprising a plurality of vanes 302 configured to induce swirl or rotation into a fluid passing there through. It is preferred that the flow mixer 300 be configured with vanes 302 and open areas 306 so as not to create or increase back pressure or decrease the flow velocity of the combustion gases. The flow mixer 300 may comprise a separate structure that may be inserted into the reaction chamber or may be fabricated within the existing structures of the reaction chamber. If used, the flow mixer 300 preferably should be placed in a location with the reaction chamber so that it mixes unreacted combustion gases and recycled or redirected gases that were reacted by the second catalyst element. It will be appreciated that a flow mixer, such as that illustrated in FIGS. 3A and 3B, may be used with the embodiments illustrated in FIGS. 1 and 2, and other embodiments not specifically identified herein.

Figure 4B:
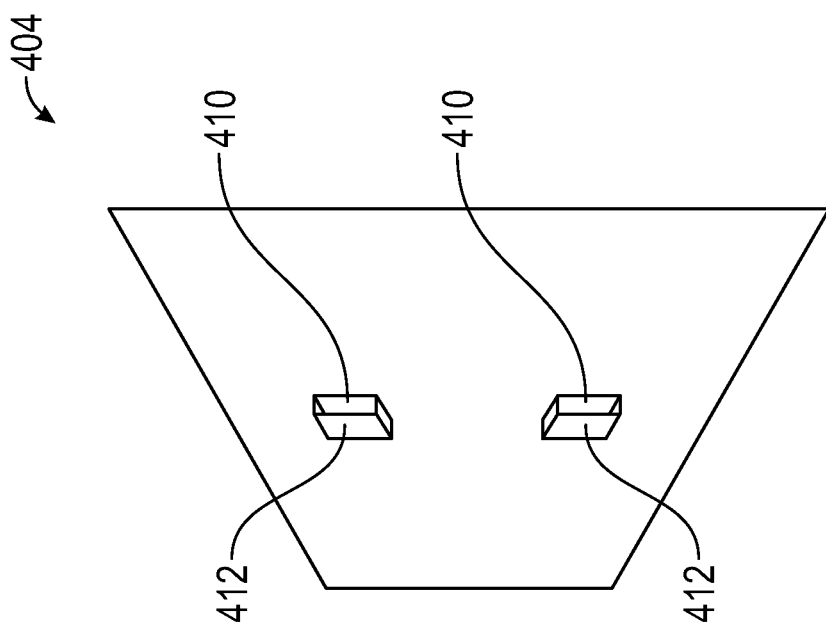
FIGS. 4A and 4B illustrate inlet components useful with catalytic reaction chambers according to aspects of the inventions disclosed herein.
Figure 4A:
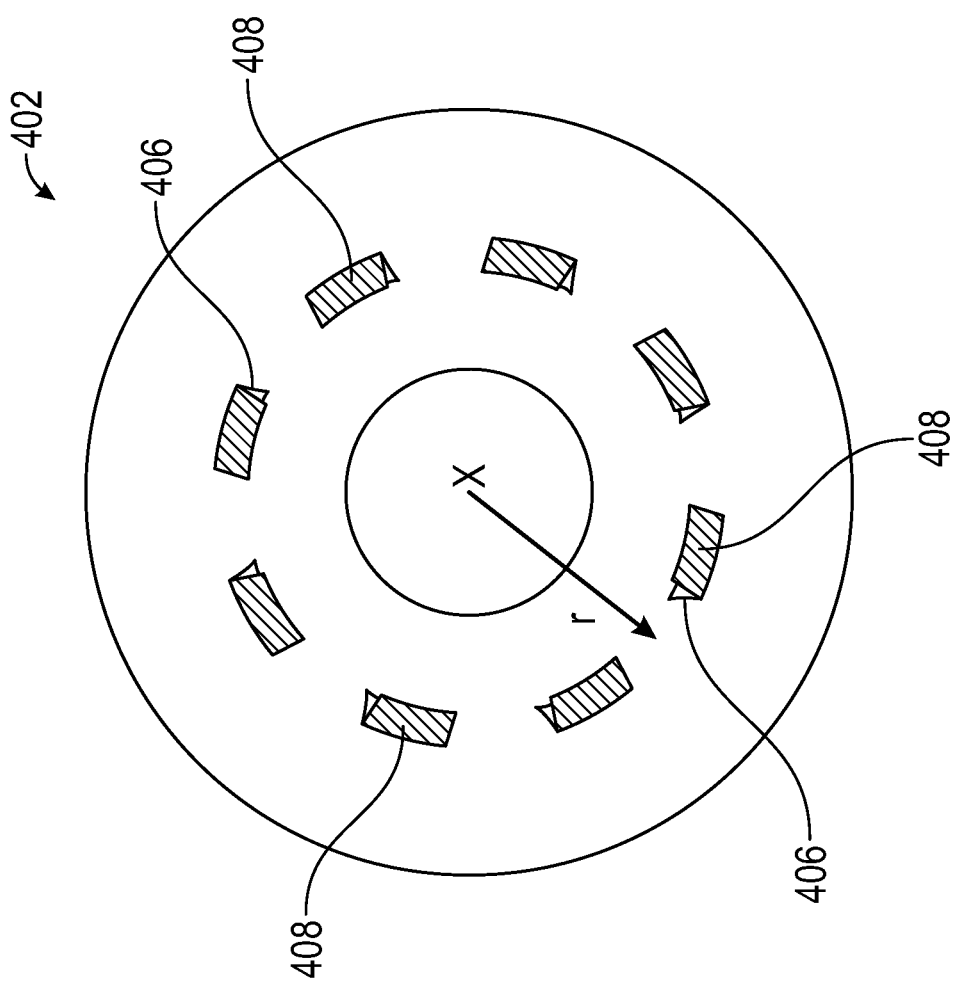

FIGS. 4A and 4B illustrate embodiments of inlet transitions 402 and 404 that may be used with embodiments of reaction chambers like those illustrated in FIGS. 1 and 2. FIG. 4A illustrates a plurality of flow openings 406 located a common radial distance, r, from a centerline of the inlet transition 402. Each flow opening 406 has an associated hood or shield 408 useful in creating a lower pressure area adjacent the flow opening 406 to facilitate flow of gases through the opening 406. While the embodiment illustrated in FIG. 4A has the flow openings 406 at common radial locations, it will be appreciated that the flow openings may be placed at varying radial locations from the centerline to control where the exiting gases flow through the first catalyst element. FIG. 4B illustrates an inlet transition 404 similar to the inlet transition 402 of FIG. 4A, however, the flow openings 410 are shielded or hooded on all sides except for the downstream opening 410.

Figure 5:
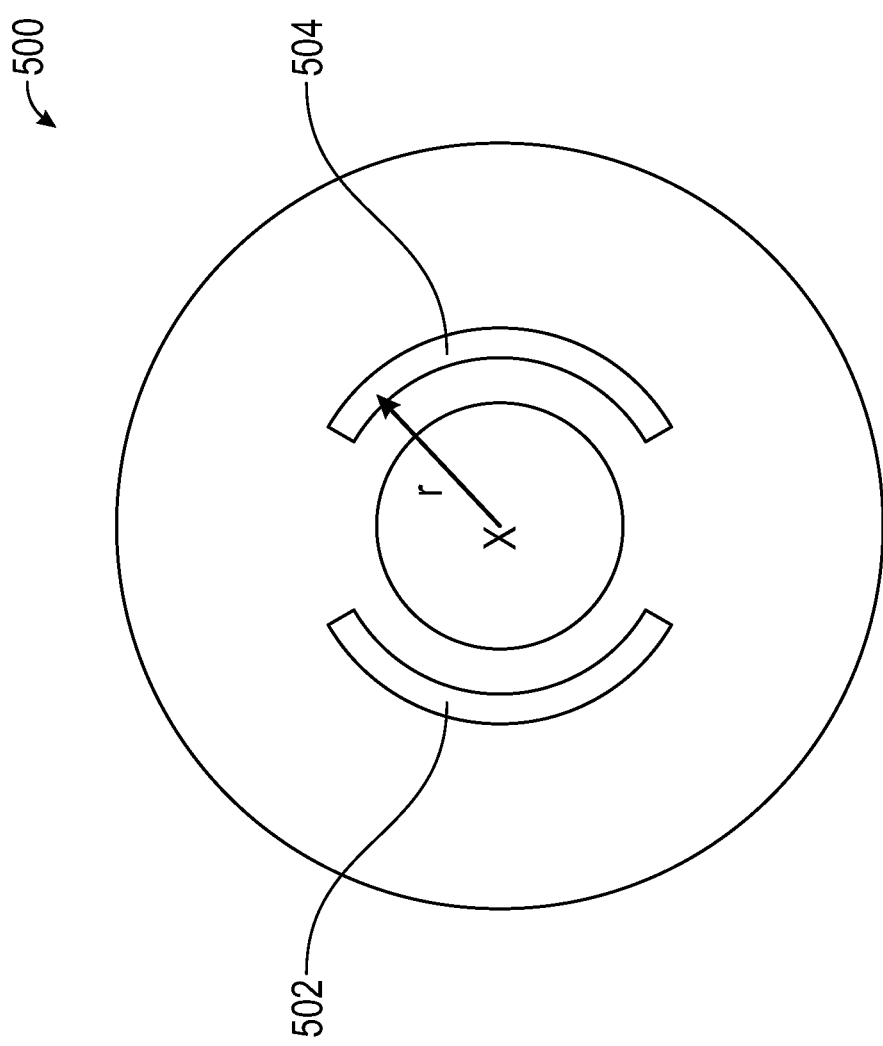
FIG. 5 illustrates another inlet component useful with catalytic reaction chambers according to aspects of the inventions disclosed herein.

FIG. 5 illustrates an inlet transition 500 that may be used with embodiments of reaction chambers like the embodiments illustrated in FIGS. 1A and 1B and 2. FIG. 5 illustrates two flow opening channels 502 and 504 located a common radial distance, r, from a centerline of the inlet transition 500 such that the inlet (e.g., 112, 212) can shield the openings 502, 504 as described above. It will be appreciated that while two flow opening channels are illustrated a plurality of flow openings may be employed at common varying radial distances.

It will be appreciated that the inlet 112 illustrated in FIG. 1A and 1B may be used with other embodiments of the inventions disclosed herein, including, but not limited to the embodiment illustrated in FIG. 2. Further the inlet transitions illustrated in FIGS. 4A, 4B, and 5, may be used with other embodiments of the inventions disclosed herein, including, but not limited to the embodiment illustrated in FIG. 1.

Figure 6:
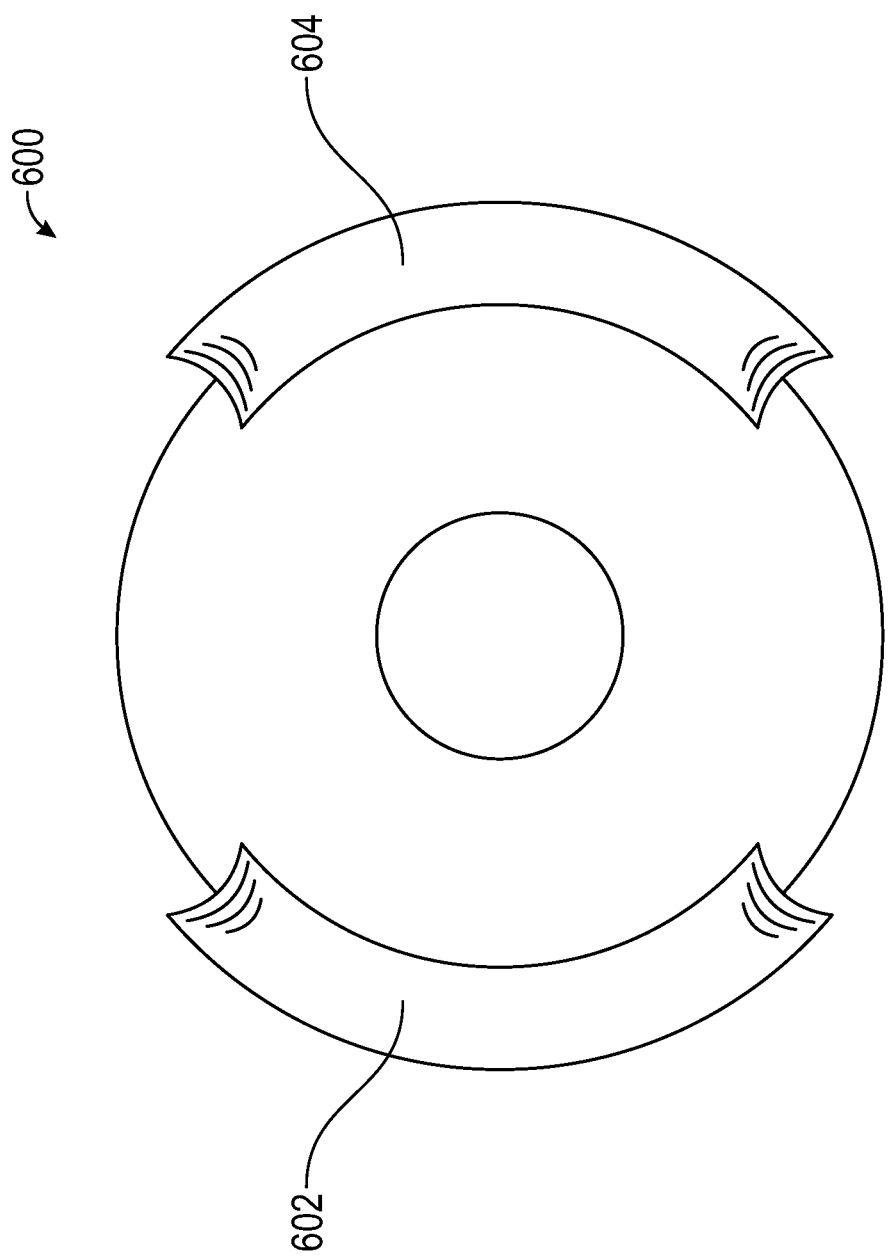
FIG. 6 illustrates an outlet component useful with catalytic reaction chambers according to aspects of the inventions disclosed herein.

FIG. 6 illustrates an outlet transition 600 useful with embodiments of reaction chambers similar to that shown in FIG. 2. As described above, the outlet transition 600 may be a truncated cone having one or more diverter channels 602, 604 associated with an outer periphery of the transition 600. It will be appreciated that the size, shape, and location of the diverter(s) 602 relative to the first catalyst element will determine the amount of combustion gas reacted by the first catalyst element that is diverted through the second catalyst element.

Having the benefit of this disclosure, those of skill in this art will appreciate that numerous embodiments of the inventions disclosed herein may be designed in which combustion gases are passed through a second catalyst element configured to cause a specific chemical reaction, such as, but not limited to, a reduction reaction configured to reduce nitrogen oxides to nitrogen, and then those reacted gases are passed back through the first catalyst element. These inventions increase the efficiency of emission reductions compared to conventional three-way catalytic converters. When designed for use with diesel engines, these inventions are useful to reduce or eliminate the need for ammonia-bearing fluids.

Figure 7A:
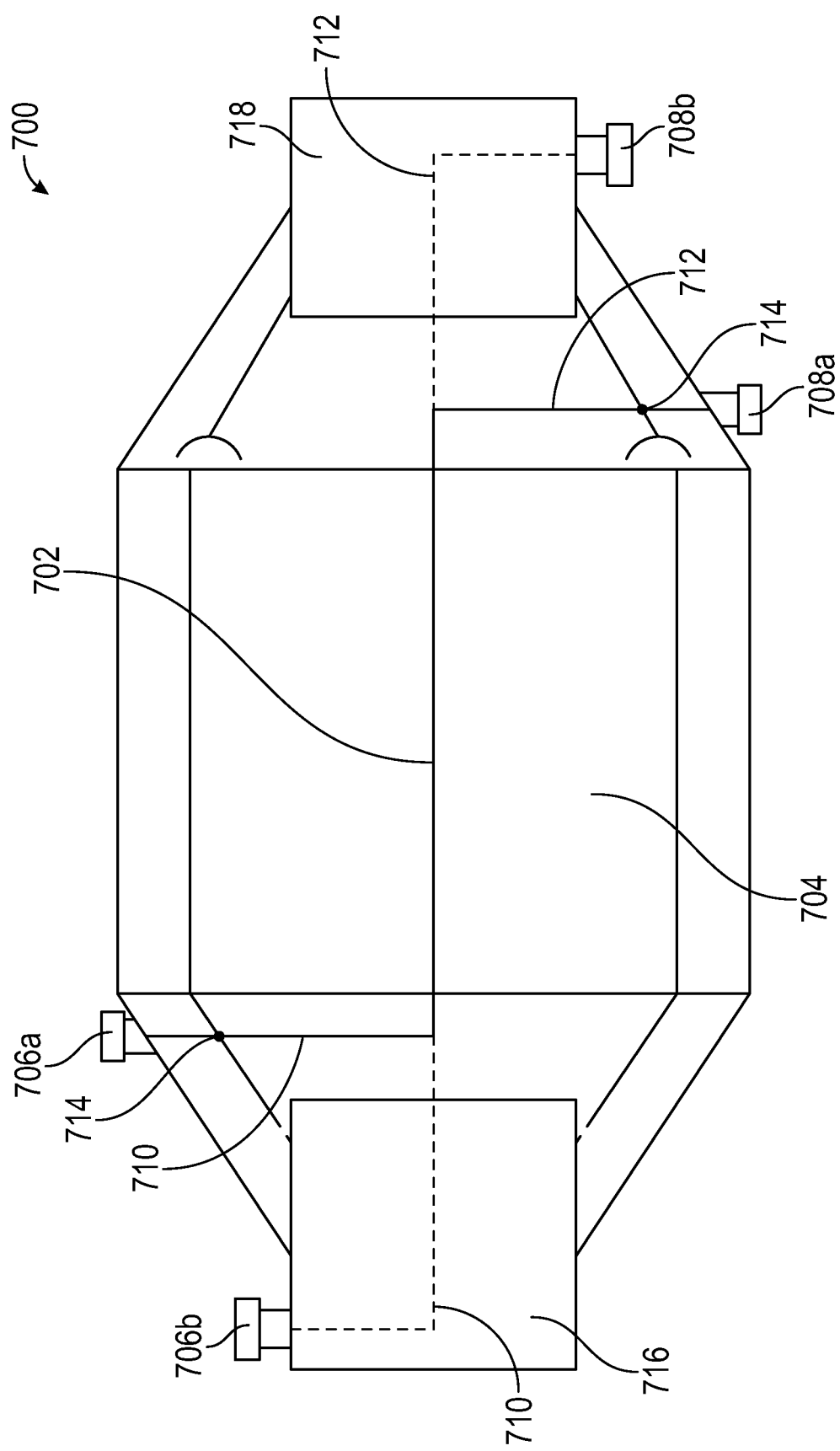
FIGS. 7A and 7B illustrates catalytic reaction chambers with embedded heating elements.
Figure 7B:
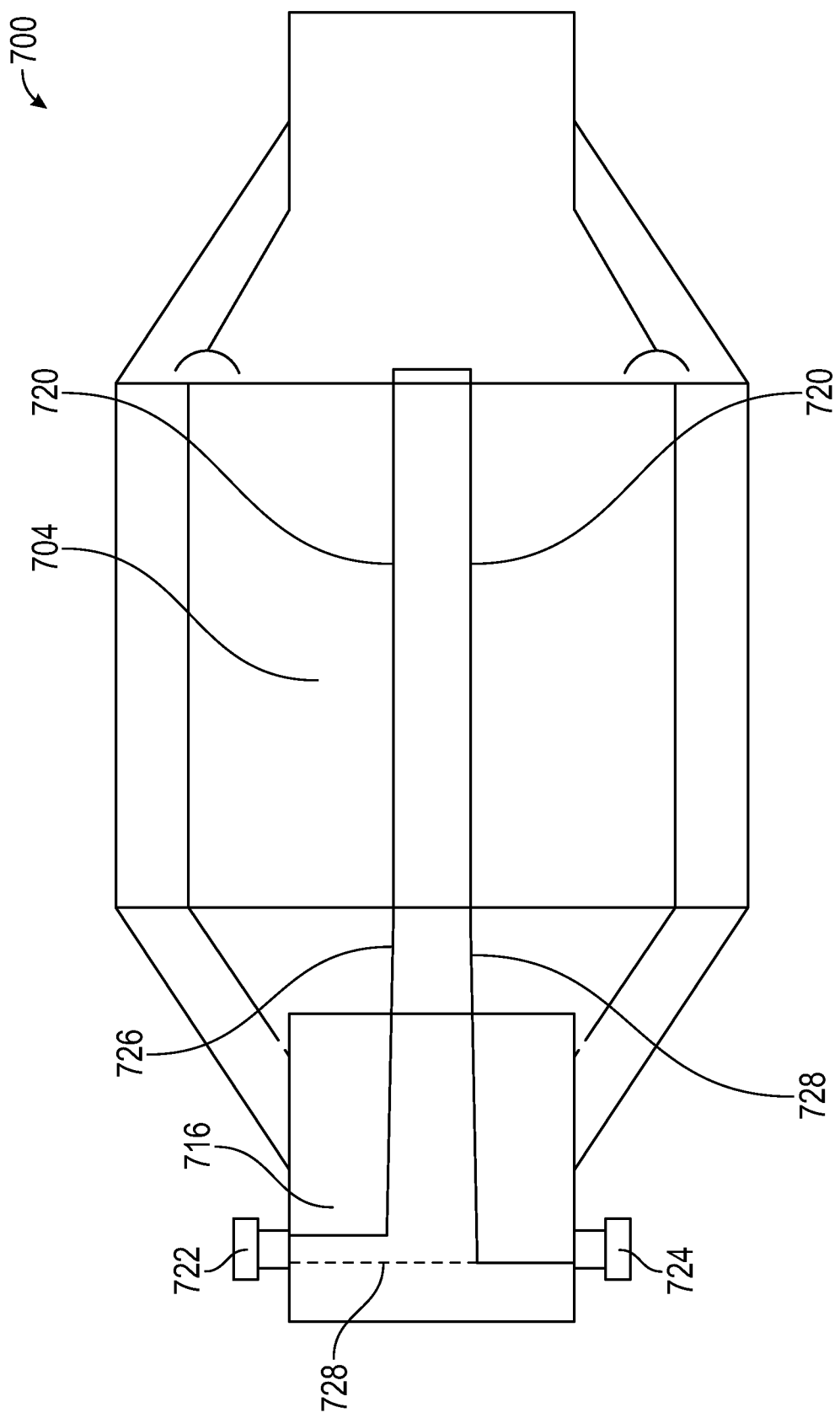

Turning now to other aspects of the inventions disclosed herein, FIGS. 7A and 7B illustrate a reaction chamber 700 comprising a heating element 702 disposed at or adjacent a centerline of the first catalyst element 704. The heating element 702 is preferably fabricated from a material that can withstand the temperatures of a reaction chamber operating at normal conditions, for example from about 700° F. to about 900° F. For example, and not limitation, tungsten and tungsten alloy heating elements may be used. To electrically connect the heating element 702 to sources of electricity, connection bungs 706*a,b* and 708*a,b* are provided. In the embodiment illustrated in FIG. 7A, the portion of the heating element 702 embedded in the first catalyst element is connected to the connectors with heating element material. For example, the element 702 and leads 710, 712 may be, but are not required to be, fabricated from the same material, such as tungsten. If the leads are required to pass through structural elements, such as an inlet or outlet transition, it is preferred that a seal 714 be employed to prevent combustion gases from escaping regions designed to contain them. Alternately, the leads 706, 708 may be extended into the inlet and outlet regions 716, 718.

FIG. 7B illustrates a heating element 720 configured to traverse the first catalyst element 704 so that the connection bungs 722, 724 are located on end of the reaction chamber, such as the inlet. Alternately, the leads 726, 728 can be connected to a single connection bung 722. While FIGS. 7A and 7B illustrates embodiments of reaction chambers similar in design to that illustrated in FIG. 2, it will be appreciated that the heating elements described herein may be utilized in any embodiment incorporating aspects of the inventions disclosed herein, including, but not limited to the embodiment illustrated in FIG. 1.

Figure 8:
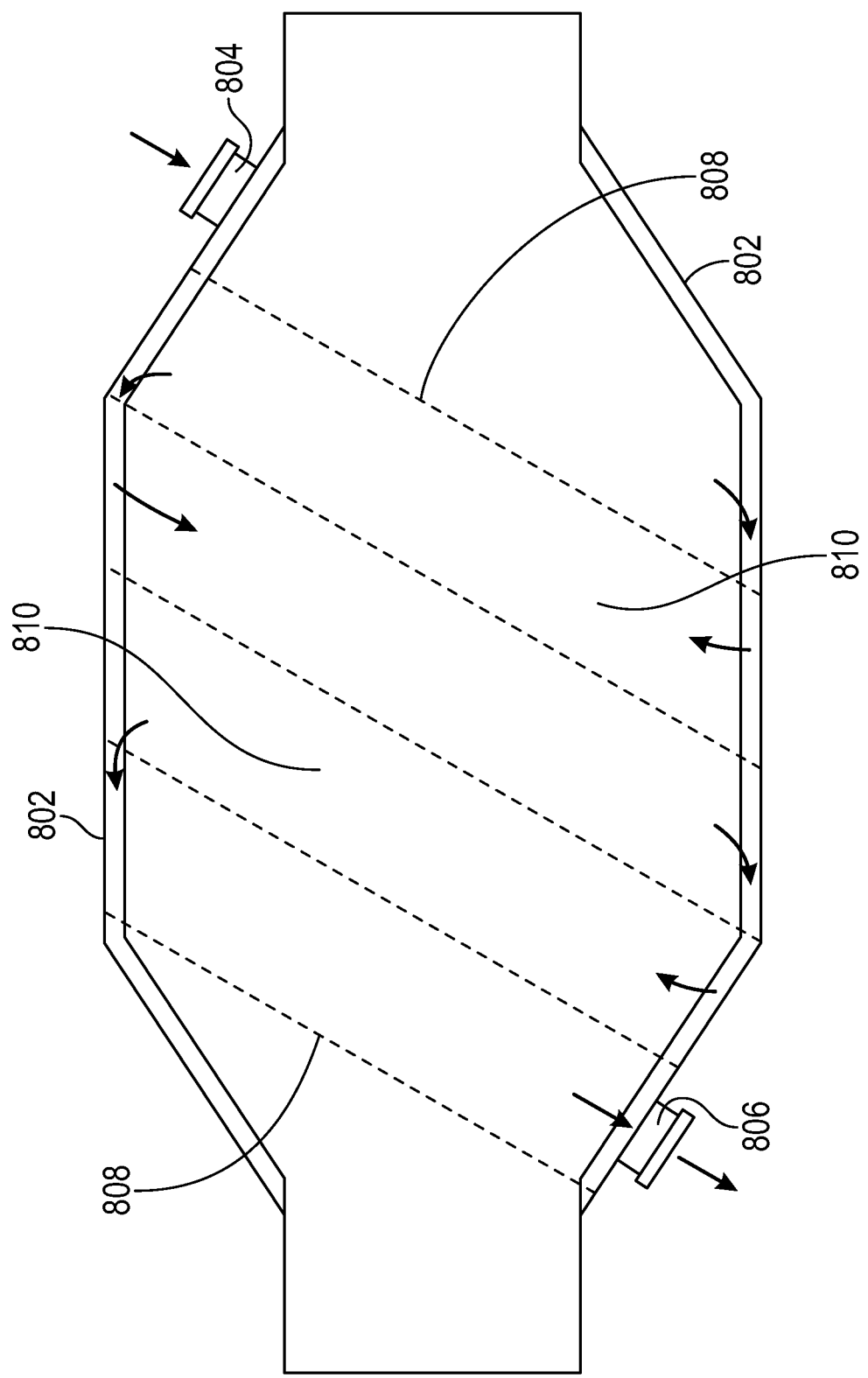
FIG. 8 illustrates a catalytic reaction chamber having a fluid flow path on the outer periphery of the chamber.

Turning to another aspect of the inventions disclosed herein, FIG. 8 illustrates a fluid heating jacket 802 surrounding an outside of the reaction chamber. The jacket 802 may be joined to the outside of the reaction chamber, such as by welding, to create a fluid volume, such as a conduit or channel For example, the jacket may create a single volume plenum having an inlet 804 and an outlet 806. Fluid, such as diesel fuel, water jacket fluid, passenger compartment fluid or other fluid may enter the jacket 802 through inlet 804 and exit through exit 806. Heat generated by the reaction chamber may be transferred to the fluid flowing through the jacket 802. In alternate embodiments, a channel guide 808, such as round or square wire may be coupled between the outside of the reaction chamber and the inside of the jacket 802 to form flow channels or conduits between the inlet 804 and outlet 806. Although FIG. 8 illustrates a single flow channel 810 formed by flow guides 808, those of skill will appreciate that multiple flow channels or conduits can be created with jacket 802 to heat multiple fluids, such as, but not limited to combustion fuel and compartment heater fluid.

Having described my inventions generally and with reference to several specific embodiments, those of skill having benefit of this disclosure will now understand that other and further embodiments utilizing one or more aspects of the inventions described above can be devised without departing from the spirit of my inventions. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by me, but rather, in conformity with the patent laws, I intend to protect fully all such modifications and improvements that come within the scope or range of equivalent of the following claims.

What is claimed is:

1. A method of reducing undesirable emissions from internal combustion engine exhaust, comprising:
   providing a catalytic reaction chamber having an inlet and an outlet, a first catalyst having a catalytic function and disposed between the inlet and the outlet, and a second catalyst disposed between the inlet and the outlet and about the first catalyst, the second catalyst having a catalytic function different from the catalytic function of the first catalyst;
   flowing engine exhaust away from the engine and into a catalytic reaction chamber inlet;
   passing a first portion of the engine exhaust entering the catalytic reaction chamber inlet across a first the first catalyst and through the catalytic reaction chamber outlet;
   passing a second portion of the engine exhaust entering the catalytic reaction chamber inlet across the second catalyst having a catalytic function different from the first catalyst surface;
   diverting the second portion of the engine exhaust that has passed across the second catalyst to the catalytic reaction chamber inlet; and
   mixing the diverted second portion of the engine exhaust with engine exhaust entering the catalytic reaction chamber inlet.

2. The method of claim 1, wherein diverting the second portion of the engine exhaust comprises diverting between about 15% and about 45% of the engine exhaust that has entered the catalytic reaction chamber inlet.

3. The method of claim 1, further comprising providing a barrier separating the first catalyst form the second catalyst so that engine exhaust in the first or second catalyst does not leak into the other catalyst.

4. The method of claim 1, further comprising a plurality of secondary inlets disposed in the catalytic reaction chamber inlet.

5. The method of claim 4, further comprising shrouding the secondary inlets relative to an upstream portion of the catalytic reaction chamber.

6. The method of claim 4, wherein the diverted second portion of engine exhaust is entrained through the secondary inlets with engine exhaust entering the catalytic reaction chamber inlet.

7. The method of claim 1, wherein the first catalyst is an oxidation catalyst.

8. The method of claim 1, wherein the second catalyst is reduction catalyst.

9. The method of claim 1, wherein the first catalyst is an oxidation catalyst, and the second catalyst is reduction catalyst.

10. The method of claim 3, further comprising transferring heat from the first catalyst to the second catalyst across the barrier.

11. A method of reducing undesirable components in internal combustion engine exhaust, comprising
    providing a catalytic reaction chamber having an inlet and an outlet, a first catalyst having a catalytic function and disposed between the inlet and the outlet, and a second catalyst disposed between the inlet and the outlet and about the first catalyst, the second catalyst having a catalytic function different from the catalytic function of the first catalyst;

flowing engine exhaust away from the engine and into the catalytic reaction chamber inlet;

passing the engine exhaust entering the catalytic reaction chamber inlet across the first catalyst;

passing a first portion of the engine exhaust that has passed across the first catalyst through the catalytic reaction chamber outlet;

diverting a second portion of the engine exhaust that has passed across the first catalyst across the second catalyst in a countercurrent direction to the engine exhaust passing across the first catalyst; and mixing the diverted second portion of the engine exhaust with engine exhaust entering the catalytic reaction chamber inlet.

12. The method of claim 11, wherein diverting the second portion of the engine exhaust comprises redirecting between about 15% and about 45% of the engine exhaust that has passed across the first catalyst.

13. The method of claim 11, further comprising providing a barrier separating the first catalyst from the second catalyst so that engine exhaust passing across the first or second catalysts does not leak into the other catalyst.

14. The method of claim 13, further comprising transferring heat from the first catalyst to the second catalyst across the barrier.

15. The method of claim 11, further comprising a plurality of secondary inlets disposed in the catalytic reaction chamber inlet.

16. The method of claim 15, further comprising shrouding the secondary inlets relative to an upstream portion of the catalytic reaction chamber.

17. The method of claim 15, wherein the diverted second portion of engine exhaust is entrained through the secondary inlets with engine exhaust entering the catalytic reaction chamber inlet.

18. The method of claim 11, wherein the first catalyst is an oxidation catalyst.

19. The method of claim 11, wherein the second catalyst is reduction catalyst.

20. The method of claim 11, wherein the first catalyst is an oxidation catalyst, and the second catalyst is reduction catalyst.

* * * * *